Oct. 25, 1966     R. M. FISHER     3,280,873
LOCKING RING FOR THREADED INSERTS
Filed Nov. 13, 1964
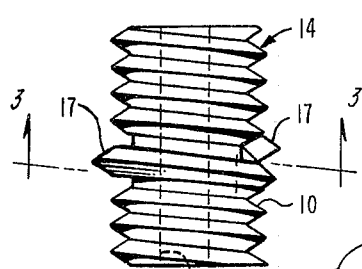
FIG.-1
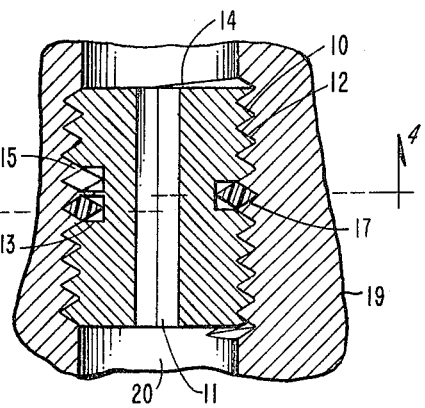
FIG.-2
FIG.-8
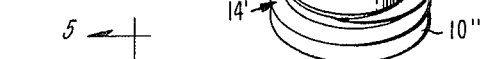
FIG.-3     FIG.-9
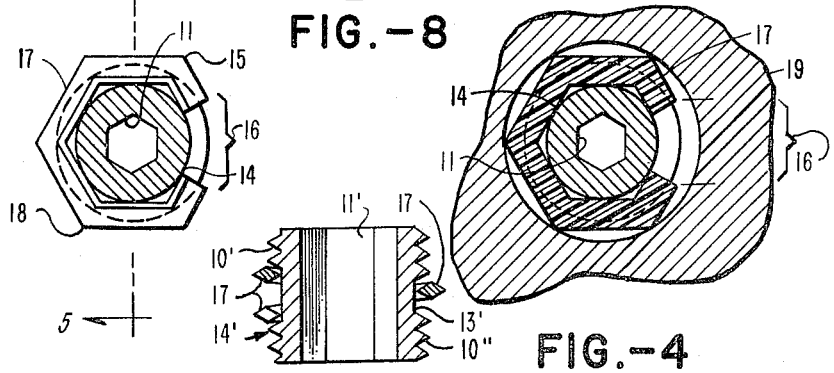
FIG.-4     FIG.-6
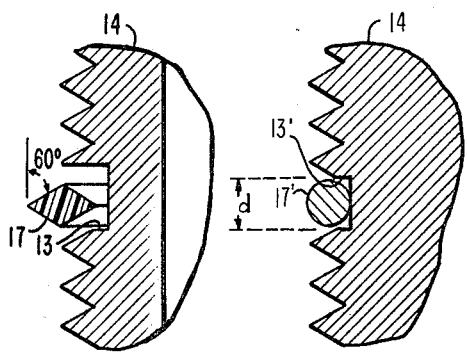
FIG.-5     FIG.-7
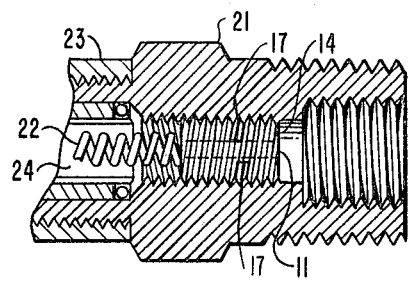
ROBERT M. FISHER
INVENTOR.
BY Norman L. Chalfin
AGENT

United States Patent Office 3,280,873
Patented Oct. 25, 1966

3,280,873
LOCKING RING FOR THREADED INSERTS
Robert M. Fisher, 20966 Las Flores Mesa Drive,
Malibu, Calif.
Filed Nov. 13, 1964, Ser. No. 410,963
1 Claim. (Cl. 151—25)

This invention relates to a locking type of threaded insert for fluid or pneumatic valves and more particularly sets forth a novel insert for positively and settably adjusting the shut off level of certain predetermined shut-off pressure safety valves.

In my U.S. Patent Number 2,968,315 issued January 17, 1961, and entitled "Predetermined Pressure Shut-Off Valve," I have described and claimed an automatic shut-off valve which cuts off the flow of fluid at a predetermined pressure. I have improved this valve with a novel locking-ring and screw insert mechanism by which the adjustment screw for setting the shut-off point of the valve described in the patent becomes an extremely effective, positive and vibration-free adjustment device.

The novel locking-ring insert and screw may also be used for any application wherein a threaded insert is required to act as a closure member in the end of an internally threaded pipe member and provide a more effective seal while being adjustable as to its position within the pipe.

In the prior art it has been a practice to use a device which is marketed under the trade style of "Helicoil" to lock a screw in a threaded aperture. Another article of this nature manufactured under the trade style "Nylock" has been used.

The former incorporates a spring coiled element of a number of turns, the middle components of which is hexagonal and which is first inserted into a threaded aperture and the screw to be locked in place is inserted thereafter into the spring coiled element. In order to be effective the screw must always engage the hexagonal middle turn of the spring coil element. This tends to lock the screw in place against vibration.

The latter device uses a cross drilled screw into the bore of which a nylon pellet is pressed. The plastic "memory" of the pellet tends to urge it against the walls of the threaded aperture to lock the screw in place against vibration of the screw.

The present invention overcomes the necessity for the screw always to be of a sufficient length to contact a particular central turn of a separate spring coil as in the "Helicoil" device and also this invention will not require any cross drilling operation in the screw. By the use of the present invention the costly extra spring coil part and/or the cross drilling operation are avoided making this invention more economical in use.

Accordingly the principal object of this invention is to provide a locking threaded insert which locks at the point at which it is set in a threaded aperture.

It is another object of this invention to provide a threaded insert for a fluid inlet or outlet, said insert having an undercut groove therein to receive a split-ring locking washer of an inert plastic or other relatively compressible metallic material, said split-ring locking washer being shaped to fit the groove configuration of the threaded area into which the insert is threaded.

It is a further object of this invention to provide a lockable screw insert for predetermined shut off pressure valves which is more easily set and locks more positively than prior art devices.

It is still another object of this invention to provide a more economical and more easily fabricated locking screw insert for predetermined pressure shut-off valves.

It is an even further object of this invention to provide a combination of a screw with an undercut therein to receive a split-ring locking washer of predetermined configuration for locking the screw in a threaded aperture.

These and other objects of this invention will be more fully understood from the specification which follows and the appended claim taken together with the accompanying drawing in which:

FIGURE 1 is an overall external side elevational view of an insert according to this invention;
FIGURE 2 is a longitudinal section in exaggerated detail through a partially cut away portion of pipe into which an insert according to this invention has been threaded, the insert being shown in section;
FIGURE 3 is a section through 3—3 of FIGURE 1;
FIGURE 4 is a lateral section through 4—4 of FIGURE 2;
FIGURE 5 is a detail in cross section through 5—5 of FIGURE 3 cut away in part to show the interrelationships between the insert according to this invention and the plastic ring element therearound;
FIGURE 6 is a portion in longitudinal section of a typical valve using the invention which is shown inserted therein;
FIGURE 7 shows the ring in section as in FIGURE 5 but having a round cross-section;
FIGURE 8 is a perspective view of an embodiment of the invention as actually used; and
FIGURE 9 is a cross section longitudinally through 8—8 of the article in FIGURE 8.

Referring now to FIGURES 1 and 5 wherein the novel unit according to this invention is shown, a screw 14 of appropriate length has a hexagonal opening 11 therethrough and threads 10 along the length thereof. At approximately the middle of screw 14 an undercut 13 is taken to the limit of thread depth. Screw 14 may be as long as its cross-section or longer than its cross section as required. Undercut 13 is generally rectangular in cross-section and follows around the screw 14 along a thread path thereon forming a peripheral groove following said thread path about said screw 14. This results effectively in the interruption at 13 of the metal forming the threads 10 of said screw 14 over from 1½ to 2 complete thread turns, as may be seen in FIGURE 2 and in FIGURES 8 and 9.

As may be seen in FIGURE 5 the undercut can be deeper than the thread depth normally developed by threads 10 by about as much again as the thread depth itself. As is clear to those skilled in the art the crossover may exceed the two grooves previously mentioned.

A plastic or metallic split ring 17 of approximately diamond shaped cross section is snapped into undercut 13 as may be seen in FIGURE 1. Ring 17 preferably has a hexagonal perimeter. The ends of plastic or metallic ring 17 are separated when ring 17 is in the undercut area 13. This may be seen at 16 where they are so separated, when ring 17 is positioned in groove 13 on screw 14. In positioning split locking ring 17 on groove 13 it is set so that it may go beyond the starting point in the next turn thereby providing a complete surround of the screw 14 by ring 17. As shown in FIGURES 1 and 3 the ring 17 may not complete a full turn. Split ring 17 may be of Teflon or nylon or any other readily compressible material.

In FIGURE 3 which is a section through 3—3 of FIGURE 1 it may be seen that the hexagonally shaped split ring 17 fits tightly about undercut 13 in screw 14 and that the corner surfaces such as 15 and 18 of hexagonal ring 17 normally extend beyond the outer edges of threads 10 of screw 14 so that the corners of the hex structure of ring 17 may "bite" into the inner threads of any pipe into which insert screw 14 is installed. This may be seen in FIGURE 2 where the inventive article 14 with ring 17 is shown threaded into a pipe section 19 with edge 15 biting into the inner threads 12 of pipe 19. The term biting here refers to the spring-like compressional action of corner 15 which results in its conformation to the groove of its mating surface in the threads of pipe 19.

Using a hexagonal cross section wrench in opening 11 of screw 14 which is inserted through aperture 20 in pipe 19, the threaded insert 14 or 14' with the ring 17 according to this invention may be rotated along the length of the inner threaded aperture in pipe 19 for adjustment of the shut-off pressure point as described in my above mentioned Patent Number 2,968,315.

The cross-sectional view of FIGURE 4 clearly shows how hexagonal split-ring 17 tends to assume the circular shape of the interior of pipe 19 by biting thereinto when inserted therein.

FIGURE 6 is an illustration of a typical use configuration of the insert according to this invention in a valve 21 according to Patent Number 2,968,315. Insert 14 or 14' with its associated split ring 17 is threaded into valve 21 against the urge of spring 22 in chamber 24 of valve 21.

Lower chamber 23 of FIGURE 6 normally contains the remaining portions of the valve structure 21. Adjustment of insert 14 may be made by insertion of a hexagonal wrench in opening 11 to press screw 10 upon spring 22 in chamber 24, or to relieve the pressure thereon.

A particular feature of the split-ring 17 according to this invention is that a single split-ring of appropriate dimensions can fit properly a range of some seven sizes of threads on several near diameters of screws such as 14 or 14'. The perimetral length of ring 17 may be so chosen as to encompass in a single ring the capability of use on screw diameters for screws 14 or 14' over a two-to-one range of diameters. The overlap 16, if present, will be greater for smaller diameter screws than for larger diameter screws.

The material for ring 17 or 17' has been mentioned above as being preferably a plastic. It should be clear to one skilled in the arts appertaining to this invention that there may be suitable metallic or fibrous materials which may reasonably be used for such rings as split-ring 17 within the ambit of the claimed invention employed in the manner set forth hereinabove.

It should be clear also that split-ring 17 may have a circular cross section as at 17' in FIGURE 7. Where a circular cross section ring is used as shown in FIGURE 7 the groove 13' may be either of such thickness as to accommodate a split-ring following more than one thread or alternatively the groove 13' may have a dimension just sufficient to receive ring 17' in which case ring 17' will have the configuration of a split O-ring. It should be readily apparent from this that a ring such as 17 with a diamond cross section may be used in O-ring fashion in a groove such as 12'.

With reference to FIGURES 8 and 9 wherein another embodiment of this invention is shown in a perspective view it may be seen that a screw assembly 14' may be used which is relatively short. The absence of ring 17 or 17' in FIGURE 8 is to show the appearance of the article prior to the insertion thereon of a ring such as 17 or 17'. The threads 10' and 10'' in the absence of undercut groove 13' would be continuous.

What is claimed as new is:

In a predetermined pressure shut-off valve having a threaded pressure setting aperture therein for receiving a setting screw to be positioned therein, a setting screw assembly therefor comprising:

a screw body having threads along the length thereof;
an undercut groove in said screw body, having a generally rectangular cross section and being cut helically about the mid-portion of said screw to interrupt the line of said screw threads for the width of said undercut groove along said body and extending along the path of the screw threads over a distance greater than one convolution of said screw threads; and
a split-ring of relatively flexible compressible material softer than the material of said screw having a hexagonal internal and external configuration and extending about said screw substantially in excess of 180 degrees, said split ring being snapped into said groove and engaging said groove bottom and being of a generally diamond shaped cross section extending from said groove bottom at least to the crest of the screw thread;
whereby when said setting screw having said split-ring snapped thereover is inserted into the aperture for receiving a setting screw and threaded thereinto, said split ring is compressed into a fitting diametral shape in said groove by the compression thereof into the inner threaded walls of said aperture to lock said setting screw into said aperture to provide a more positive and vibration-proof positioning of said setting screw assembly therein for adjusting the predetermined pressure shut-off point of said valve.

References Cited by the Examiner

UNITED STATES PATENTS

| | | | |
|---|---|---|---|
| 1,809,620 | 6/1931 | Cole | 151—7 |
| 1,893,067 | 1/1933 | Arenz. | |
| 1,957,095 | 5/1934 | Cole. | |
| 2,874,741 | 2/1959 | Brancato. | |
| 2,968,315 | 1/1961 | Fisher | 137—596 |

FOREIGN PATENTS

| | | |
|---|---|---|
| 1,043,119 | 6/1953 | France. |
| 317,106 | 12/1919 | Germany. |

CARL W. TOMLIN, *Primary Examiner.*

EDWARD C. ALLEN, *Examiner.*

M. PARSONS, JR., *Assistant Examiner.*